US008276910B2

(12) United States Patent
Nagata

(10) Patent No.: US 8,276,910 B2
(45) Date of Patent: Oct. 2, 2012

(54) DOCUMENT FEEDER, METHOD FOR CONTROLLING THE SAME, AND RECORDING MEDIUM

(75) Inventor: Hiroaki Nagata, Ikeda (JP)

(73) Assignee: Ricoh Company, Limited, Tokyo (JP)

( * ) Notice: Subject to any disclaimer, the term of this patent is extended or adjusted under 35 U.S.C. 154(b) by 461 days.

(21) Appl. No.: 12/564,469

(22) Filed: Sep. 22, 2009

(65) Prior Publication Data

US 2010/0078874 A1   Apr. 1, 2010

(30) Foreign Application Priority Data

Sep. 29, 2008  (JP) ................................. 2008-251870

(51) Int. Cl.
*B65H 9/04* (2006.01)
(52) U.S. Cl. ......... 271/242; 271/227; 271/185; 271/186
(58) Field of Classification Search .................. 271/242, 271/184, 185, 186, 227
See application file for complete search history.

(56) References Cited

U.S. PATENT DOCUMENTS

| 4,839,740 A * | 6/1989 | Yoshida ........................ 358/498 |
| 5,246,224 A * | 9/1993 | Matsuno et al. ............... 271/242 |
| 5,784,680 A * | 7/1998 | Taruki .......................... 399/374 |
| 6,081,688 A * | 6/2000 | Okada et al. .................. 399/374 |
| 6,209,861 B1 * | 4/2001 | Kakuta et al. ................ 271/3.02 |
| 6,896,257 B2 * | 5/2005 | Yamashita et al. ............ 271/242 |
| 7,775,515 B2 * | 8/2010 | Shingai ........................ 271/3.14 |
| 7,859,728 B2 * | 12/2010 | Yun et al. ..................... 358/498 |

FOREIGN PATENT DOCUMENTS

JP    2000-313548    11/2000

* cited by examiner

*Primary Examiner* — Kaitlin Joerger
*Assistant Examiner* — Ernesto Suarez
(74) *Attorney, Agent, or Firm* — Oblon, Spivak, McClelland, Maier & Neustadt, L.L.P.

(57) ABSTRACT

A document feeder to reverse a document by conveying the document to a reverse path. The document feeder includes a conveyance roller to convey the document, a reverse roller provided along a conveyance path of the document conveyed by the conveyance roller to convey the document to the reverse path by changing a direction of conveyance of the document, and a reverse roller control unit to control the reverse roller to correct skew of the document. The reverse roller control unit controls the reverse roller to correct the skew of the document by striking the document conveyed by the conveyance roller against a nip formed between the reverse roller and a roller provided opposite the reverse roller to temporarily bend the document.

14 Claims, 6 Drawing Sheets

| DOCUMENT SIZE | DRIVE PULSE NUMBER | |
|---|---|---|
| A3 (LANDSCAPE) | $P_{A3-1}$ | |
| A4 (LANDSCAPE) | $P_{A4-1}$ | |
| A4 (PORTRAIT) | $P_{A4-2}$ | ... |
| B4 (LANDSCAPE) | $P_{B4-1}$ | |
| B4 (PORTRAIT) | $P_{B4-2}$ | |
| | ⋮ | |

DOCUMENT FEEDER, METHOD FOR CONTROLLING THE SAME, AND RECORDING MEDIUM

CROSS-REFERENCE TO RELATED APPLICATIONS

The present patent application is based on and claims priority pursuant to 35 U.S.C. §119 from Japanese Patent Application No. 2008-251870, filed on Sep. 29, 2008 in the Japan Patent Office, which is incorporated herein by reference in its entirety.

BACKGROUND OF THE INVENTION

1. Field of the Invention

Exemplary aspects of the present invention generally relate to a document feeder, a method for controlling the document feeder, and a recording medium storing a control program for causing a data processing device to execute the method for controlling the document feeder, and more particularly, to a document feeder capable of automatically reversing a document.

2. Description of the Background

Related-art image reading devices such as copiers and scanners generally include an automatic document feeder (ADF) to separate a stack of documents placed on a document stand from one another and convey the documents one by one to a position at which the documents are copied or scanned. In order for the copy or scan to be successful, the document must not be tilted or otherwise askew when copied or scanned.

A variety of mechanisms to correct a tilt of a document conveyed through a conveyance path in the ADF relative to a direction of conveyance of the document, that is, skew of the document, have been proposed. For example, Published Unexamined Japanese Patent Application No. 2000-313548 (hereinafter referred to as JP-2000-313548-A) discloses an ADF in which a document is struck against a striking roller provided along the conveyance path and bent to correct skew of the document.

In the ADF disclosed in JP-2000-313548-A, a force with which the document is struck against the striking roller is adjustable, thereby accurately correcting the skew of the document depending on characteristics of the document paper as well as mechanical tolerances of each device.

However, a large number of constituent components are required for the related-art ADFs in order to perform such skew correction, causing cost increase. For example, in an arrangement in which the document is bent by being struck against the striking roller to correct the skew of the document as described above, rotation of the striking roller is stopped while the roller is being struck by the document, and the striking roller is then rotatively driven to convey the document after the document is bent and the skew of the document is corrected. In such a case, the striking roller and a drive mechanism to drive the striking roller are required, increasing the number of components of the ADF.

The conveyance path in the ADF is partially defined by one or more sets of conveyance rollers. If a conveyance roller provided along the conveyance path to convey the document is also made to function as the striking roller, it is not necessary to provide an independent striking roller to the ADF. However, a mechanism to control rotation of the conveyance roller is additionally required to cause the conveyance roller to also function as the striking roller, leaving the problem of cost increase unresolved.

SUMMARY

In view of the foregoing, illustrative embodiments of the present invention provide a document feeder capable of automatically reversing a document and accurately correcting skew of the document at reduced cost.

In one illustrative embodiment, a document feeder to reverse a document by conveying the document to a reverse path includes a conveyance roller to convey the document, a reverse roller provided along a conveyance path of the document conveyed by the conveyance roller to convey the document to the reverse path by changing a direction of conveyance of the document, and a reverse roller control unit to control the reverse roller to correct skew of the document. The reverse roller control unit controls the reverse roller to correct the skew of the document by striking the document conveyed by the conveyance roller against a nip formed between the reverse roller and a roller provided opposite the reverse roller to temporarily bend the document.

Another illustrative embodiment provides a method for controlling a document feeder to reverse a document by conveying the document to a reverse path. The method includes the steps of conveying the document using a conveyance roller, correcting skew of the document by causing the document to strike against a nip formed between a reverse roller and a roller provided opposite the reverse roller to temporarily bend the document, and conveying the document to the reverse path by changing a direction of conveyance of the document using the reverse roller.

Yet another illustrative embodiment provides a recording medium storing a control program readable by a data processing device to cause the data processing device to perform the method for controlling the document feeder described above.

Additional features and advantages of the present invention will be more fully apparent from the following detailed description of illustrative embodiments, the accompanying drawings, and the associated claims.

BRIEF DESCRIPTION OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein.

DETAILED DESCRIPTION OF ILLUSTRATIVE EMBODIMENTS

Figure 1A:
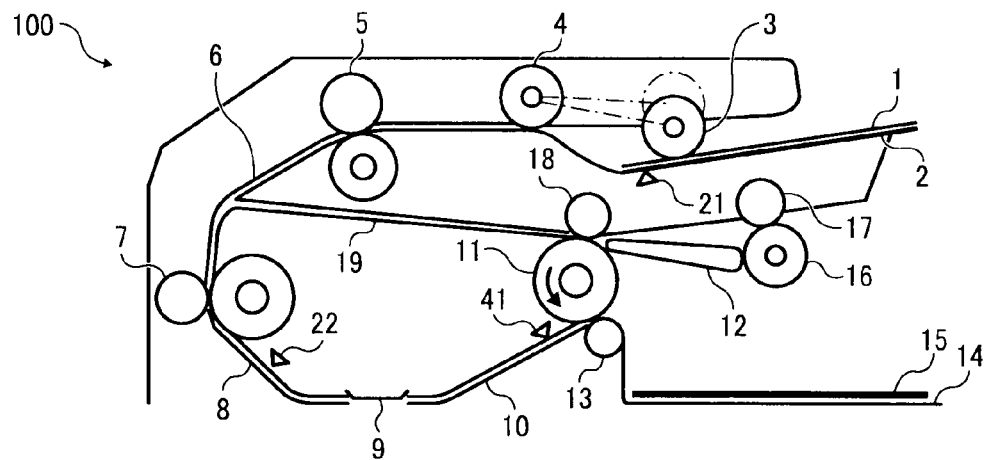
FIGS. 1A and 1B are cross-sectional views respectively illustrating an automatic document feeder (ADF) according to illustrative embodiments.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Illustrative embodiments of the present invention are now described below with reference to the accompanying drawings.

In a later-described comparative example, illustrative embodiment, and exemplary variation, for the sake of simplicity the same reference numerals will be given to identical constituent elements such as parts and materials having the same functions, and redundant descriptions thereof omitted unless otherwise required.

A description is now given of an automatic document feeder (ADF) included in an image processing device such as a multifunction device having two or more of copying, printing, scanning, and facsimile functions.

Figure 1B:
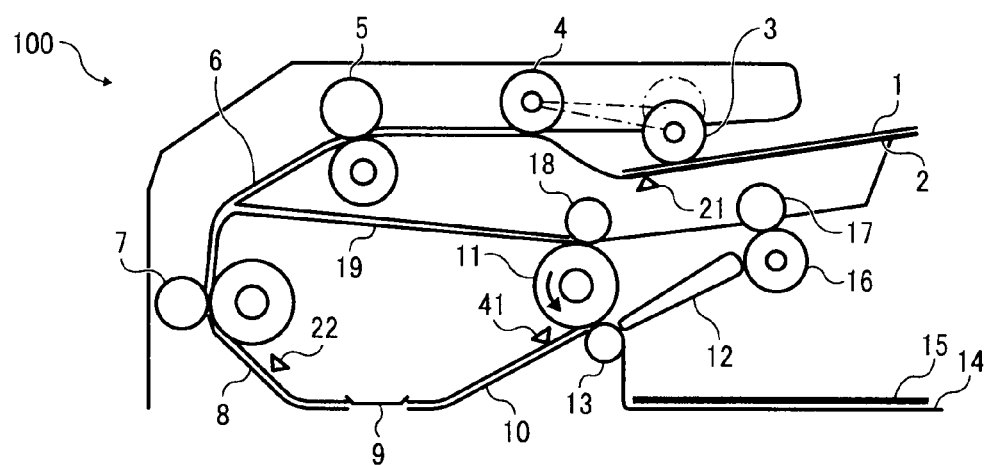

FIGS. 1A and 1B are cross-sectional views respectively illustrating an automatic document feeder (ADF) 100 according to illustrative embodiments. In particular, FIGS. 1A and 1B illustrate an overall document conveyance path along which a document is conveyed within the ADF 100. A configuration of the ADF 100 and conveyance of a document performed by the ADF 100 are described in detail below with reference to FIGS. 1A and 1B.

The ADF 100 includes a document stand 2 on which a stack of documents 1 to be separated from one another and conveyed one by one is placed. The document stand 2 includes a document set sensor 21 to detect whether or not the stack of documents 1 is set on the document stand 2.

The stack of documents 1 placed on the document stand 2 is separated from one another and conveyed one by one by a pickup roller 3 and a feed roller 4. In other words, each of the pickup roller 3 and the feed roller 4 serves as a document separation unit.

The pickup roller 3 is positioned above the document stand 2 as indicated by broken lines in FIG. 1A during a waiting mode. Accordingly, ordinarily there is a space left between the document stand 2 and the pickup roller 3 so that the stack of documents 1 can be set on the document stand 2. The pickup roller 3 is movably provided with the feed roller 4 as a point of origin. Specifically, the pickup roller 3 can be moved downward to a position indicated by solid lines in FIG. 1A to contact the top of the stack of documents 1 placed on the document stand 2.

When the ADF 100 receives an instruction to start conveyance of documents, the pickup roller 3 is moved downward to the document stand 2, so that a position of the pickup roller 3 is changed from a state indicated by the broken lines in FIG. 1A to a state indicated by the solid lines in FIG. 1A. As a result, the pickup roller 3 contacts the top of the stack of documents 1 placed on the document stand 2 and supplies to the stack of documents 1 a force to convey documents.

After the documents are conveyed from the document stand 2, the pickup roller 3 is moved upward from the document stand 2, so that the position of the pickup roller 3 is changed from the state indicated by the solid lines in FIG. 1A to the state indicated by the broken lines in FIG. 1A. The pickup roller 3 is moved upward and downward by friction generated when the feed roller 4 is driven. Specifically, the pickup roller 3 is moved downward when the feed roller 4 is rotated in a normal direction, and is moved upward when the feed roller 4 is rotated in a reverse direction.

A document placed at the top of the stack of the documents 1 (hereinafter simply referred to as a document) is separated from the rest of the stack of the documents 1 by the feed roller 4 and is conveyed to an R1 roller 7 by a pair of pullout rollers 5 via a first guide 6, and is further conveyed to a scanner 9 via a second guide 8.

The second guide 8 includes a registration sensor 22 to detect a document approaching the scanner 9. Accordingly, the scanner 9 recognizes a time to scan the document based on readings by the registration sensor 22. At the scanner 9, an image sensor, not shown, optically scans the document to read the document.

The document passing through the scanner 9 is further conveyed to a first discharge roller 11 via a third guide 10. Two rollers are provided opposite the first discharge roller 11, respectively. Specifically, a second discharge roller 13 is provided below the first discharge roller 11 to face the first discharge roller 11, and is driven by the first discharge roller 11 to discharge the document to a discharge tray 14 or to convey the document to a reverse path. A relay roller 18 is provided above the first discharge roller 11 to face the first discharge roller 11, and conveys the document to the R1 roller 7 via a reverse guide 19.

A discharge sensor 41 is provided near the first discharge roller 11. The discharge sensor 41 detects whether the document is properly discharged to the discharge tray 14. A branch plate 12 is provided on a downstream side from the first discharge roller 11 relative to a direction of conveyance of the document. The branch plate 12 switches the direction of conveyance of the document to either the discharge tray 14 or the reverse path to reverse the document after the document is read by the scanner 9.

When the document read by the scanner 9 is directly discharged to the discharge tray 14, the branch plate 12 is positioned as illustrated in FIG. 1A. In such a case, after a leading edge of the document is discharged from the ADF 100 by the first discharge roller 11 and the second discharge roller 13 and a trailing edge of the document passes through the first discharge roller 11, the document falls on the discharge tray 14 by its own weight. In FIGS. 1A and 1B, a reference numeral 15 denotes a stack of documents discharged from the ADF 100.

By contrast, when a back side of the document is to be read after a front side of the document has been read, the branch plate 12 is positioned as illustrated in FIG. 1B. In such a case, the document is conveyed to a nip formed between a first reverse roller 16 and a second reverse roller 17 by the first discharge roller 11 and the second discharge roller 13. In other words, the first discharge roller 11 serves as a conveyance roller for conveying the document to the first reverse roller 16. When the trailing edge of the document passes through the first discharge roller 11, rotation of all the rollers included in the ADF 100 is temporarily stopped. At this time, the branch plate 12 is moved upward to the position illustrated in FIG. 1A to guide the trailing edge of the document to the reverse guide 19.

The reverse roller 16 is rotated in a reverse direction when the position of the branch plate 12 is changed from a state illustrated in FIG. 1B to a state illustrated in FIG. 1A, so that the trailing edge of the document is conveyed to a nip formed between the first discharge roller 11 and the relay roller 18. The first discharge roller 11 and the relay roller 18 convey the document conveyed to the nip formed therebetween by the first reverse roller 16 to the R1 roller 7 via the reverse guide 19. As a result, the back side of the document is read by the scanner 9.

After passing through the scanner 9, the document of which the back side has been read by the scanner 9 reaches the nip formed between the first discharge roller 11 and the second discharge roller 13 again. Although both sides of the document has been already read by the scanner 9 as described above, the document is not yet discharged to the discharge tray 14 at this time because the back side of the document faces upward if the document is directly discharged to the discharge tray 14 immediately after the back side of the document has been read by the scanner 9. In order to cause the same side of the document, that is, the front side of the document, to face upward on the discharge tray 14, the branch plate 12 is positioned as illustrated in FIG. 1B again to convey the document to the reverse path 19 again. Accordingly, the direction of conveyance of the document is changed by the first reverse roller 16, and the document is conveyed to the R1 roller 7 via the reverse guide 19. Because both sides of the document have been already read by the scanner 9 as described above, the document is conveyed to the first discharge roller 11 without being read by the scanner 9. At this time, the branch plate 12 is positioned as illustrated in FIG. 1A, so that the document is discharged to the discharge tray 14.

Figure 2:
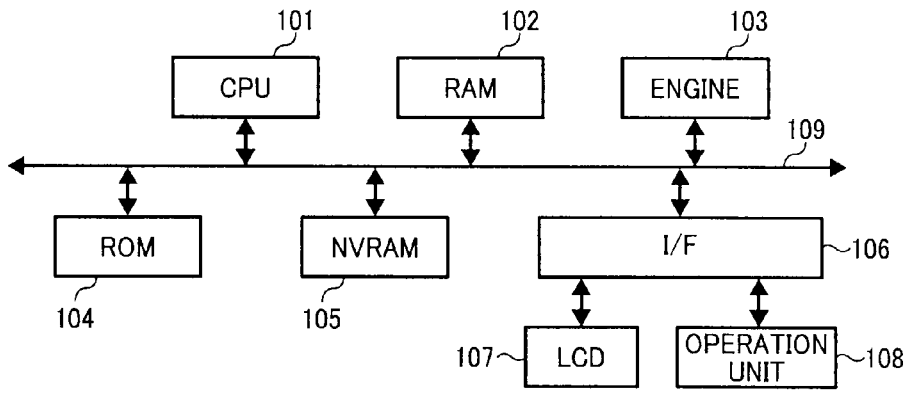
FIG. 2 is a block diagram illustrating a hardware configuration of a control system of a document reading device including the ADF illustrated in FIG. 1.

A description is now given of a control system of a document reading device including the ADF 100 according to illustrative embodiments. FIG. 2 is a block diagram illustrating a hardware configuration of the control system of the document reading device according to illustrative embodiments. As illustrated in FIG. 2, the document reading device according to illustrative embodiments has the same configuration as that of a data processing terminal, such as a widely used server or a personal computer (PC).

Specifically, the document reading device according to illustrative embodiments includes a central processing unit (CPU) 101, a random access memory (RAM) 102, an engine 103, a read-only memory (ROM) 104, a non-volatile random access memory (NVRAM) 105, and an I/F 106. The CPU 101, the RAM 102, the engine 103, the ROM 104, the NVRAM 105, and the I/F 106 are connected to one another via a bus 109. The I/F 106 is further connected to a liquid crystal display (LCD) 107 and to an operation unit 108.

The CPU 101 serves as calculation means, and controls operations of the document reading device. The RAM 102 is a volatile storage medium capable of reading and writing data at high speed, and is used as a working space when the CPU 101 processes data. The engine 103 serves as an imaging mechanism or the like of the document reading device. The ROM 104 is a read-only non-volatile storage medium, and programs such as firmware is stored therein.

The NVRAM 105 is a non-volatile storage medium capable of reading and writing data. The operating system (OS), a variety of control programs and application programs, data on operation parameters of the application programs, and so forth are stored in the NVRAM 105. The I/F 106 connects and controls the bus 109 and a variety of hardware, networks, and so forth. The LCD 107 is a graphical user interface (GUI) in which a user confirms a condition of the document reading device. The operation unit 108 is a user interface such as a keyboard and a mouse from which the user inputs data into the document reading device.

In the above-described hardware configuration, programs stored in the ROM 104, the NVRAM 105, or a storage medium such as a hard disk drive (HDD), not shown, and an optical disk, not shown, are read by the RAM 102, and the CPU 101 operates in accordance with the programs read by the RAM 102 to implement a control unit of the document reading device. A functional block that implements functions of the document reading device according to illustrative embodiments is provided as a combination of the control unit and the hardware configuration described above.

Figure 3:
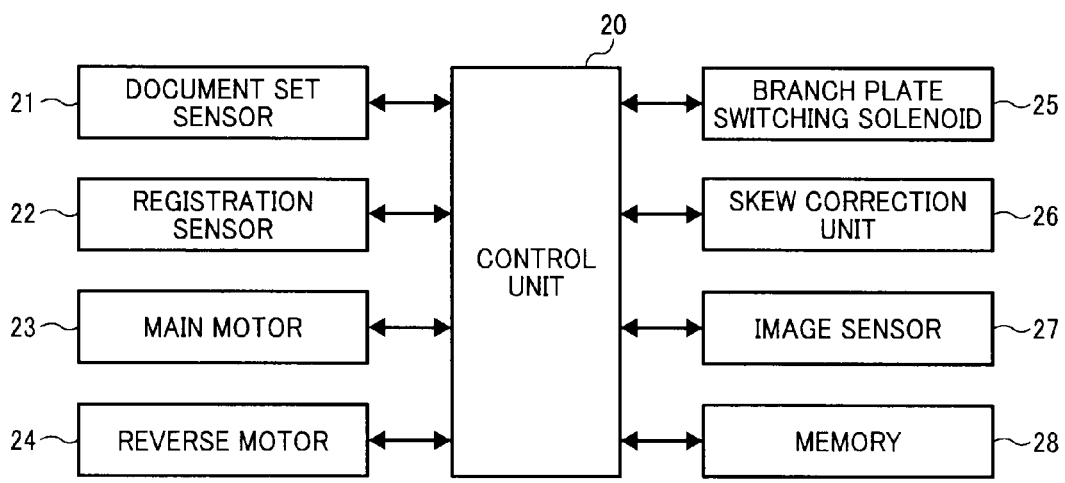
FIG. 3 is a block diagram illustrating a functional configuration of a control system of a document reading device including an ADF according to a first illustrative embodiment.

A description is now given of a functional configuration of the document reading device including the ADF 100 according to a first illustrative embodiment with reference to FIG. 3.

Referring to FIG. 3, the document reading device according to the first illustrative embodiment includes a control unit 20, the document set sensor 21, the registration sensor 22, a main motor 23, a reverse motor 24, a branch plate switching solenoid 25, a skew correction unit 26, an image sensor 27, and a memory 28.

The control unit 20 is implemented by operating programs read by the RAM 102 illustrated in FIG. 2 under control of the CPU 101, and controls operations of the document reading device. As described above, the document set sensor 21 detects a stack of documents 1 set on the document stand 2, and the registration sensor 22 detects approach of a document to the scanner 9.

The main motor 23 drives the pickup roller 3, the feed roller 4, the pullout roller 5, the R1 roller 7, and the first discharge roller 11. The reverse motor 24 drives the first reverse roller 16. The branch plate switching solenoid 25 switches the position of the branch plate 12 between the state illustrated in FIG. 1A and the state illustrated in FIG. 1B.

The skew correction unit 26 stores parameter data necessary for achieving a skew correction function referenced by the control unit 20. The parameter data stored in the skew correction unit 26 is described in detail later. The image sensor 27 optically reads the document at the scanner 9. The memory 28 is implemented by the ROM 104 or the NVRAM 105, and stores programs for controlling the document reading device.

Figure 4:
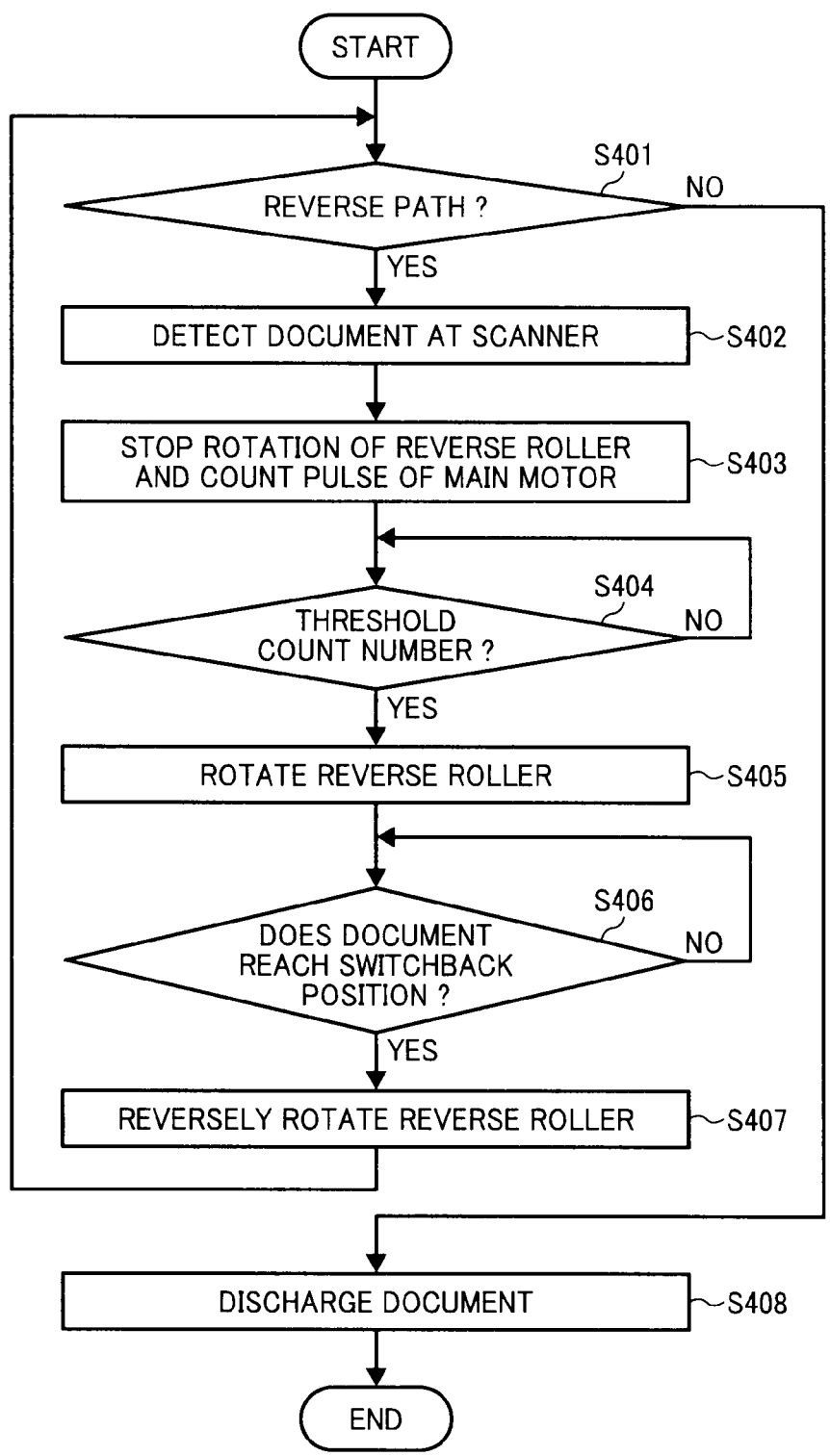
FIG. 4 is a flowchart illustrating operations performed by the ADF according to the first illustrative embodiment.

A description is now given of conveyance of documents performed by the ADF 100, particularly skew correction of the documents conveyed through the conveyance path in the ADF 100, with reference to FIG. 4. FIG. 4 is a flowchart illustrating conveyance of the documents performed by the ADF 100 according to the first illustrative embodiment.

When the pickup roller 3 and the feed roller 4 start conveying the document, the control unit 20 determines whether or not the document is to be conveyed to the reverse path at S401. When the document is not to be conveyed to the reverse path (NO at S401), the control unit 20 controls the branch plate switching solenoid 25 to move the branch plate 12 to the position illustrated in FIG. 1A. As a result, at S408, the document passing through the first guide 6, the second guide 8, and the third guide 10 is discharged to the discharge tray 14, and a series of processes is completed.

By contrast, when the document is to be conveyed to the reverse path (YES at S401), the control unit 20 controls the branch plate switching solenoid 25 to move the branch plate 12 to the position illustrated in FIG. 1B. At S402, the control unit 20 detects that the document reaches the scanner 9 via the first guide 6 and the second guide 8. Subsequently, at S403, the control unit 20 controls the reverse motor 24 to stop rotation of the first reverse roller 16, and starts counting drive pulses of the main motor 23.

Figures 5, 6:
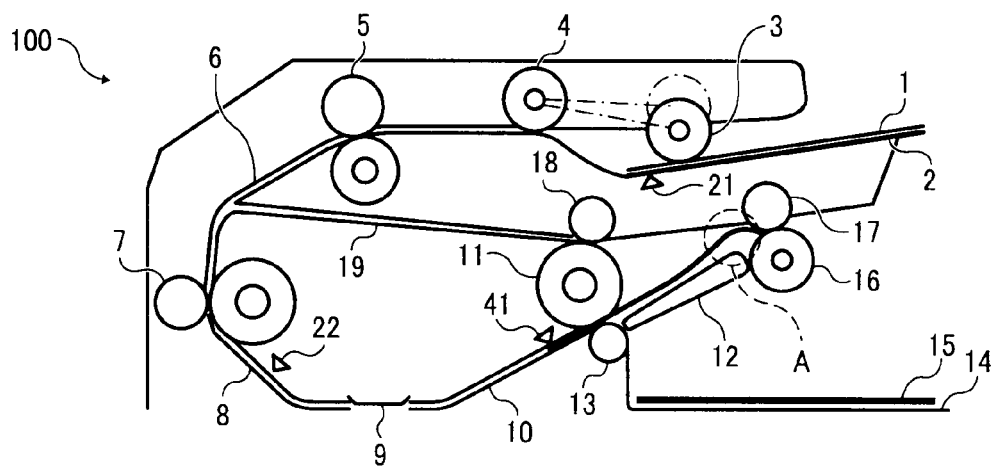
FIG. 5 is a table illustrating an example of data stored in a skew correction unit.
FIG. 6 is a cross-sectional view illustrating a state in which a document is bent in the ADF according to illustrative embodiments.

The skew correction unit 26 stores the number of drive pulses of the main motor 23 counted by the control unit 20 for each size of the documents as parameter data (hereinafter referred to as a threshold count number) as illustrated in FIG. 5. In other words, the skew correction unit 26 serves as a pulse number data storage. After the start of counting the number of drive pulses of the main motor 23 at S403, the control unit 20 drives the main motor 23 to convey the document until the number of drive pulses of the main motor 23 reaches the threshold count number stored in the skew correction unit 26. When the number of drive pulses counted by the control unit 20 reaches the threshold count number for a given size of the document being conveyed (YES at S404), the control unit 20 drives the reverse motor 12 to rotate the first reverse roller 16 in a normal direction at S405. It is to be noted that, in place of being input into the control unit 20 by the user at the start of conveyance of the document, the size of the document being conveyed through the conveyance path may be detected by a sensor, not shown, provided along the conveyance path.

The threshold count numbers stored in the skew correction unit 26 are the same as the number of drive pulses counted during a period of time from when the document being conveyed through the conveyance path passes through the scanner 9 to when the leading edge of the document reaches the nip formed between the first reverse roller 16 and the second reverse roller 17, neither of which is in operation at this time, and then is further conveyed to be bent. Specifically, when the number of drive pulses of the main motor 23 counted by the control unit 20 reaches the threshold count number, the document being conveyed through the conveyance path is bent at the nip formed between the first reverse roller 16 and the second reverse roller 17 as indicated by a dashed circle A in FIG. 6. Thereafter, rotation of the first reverse roller 16 is started in the normal direction, so that the skew of the document is corrected and the document is conveyed by the first reverse roller 16. In other words, skew correction of the document is performed by striking the document against the nip formed between the first reverse roller 16 and the second reverse roller 17, with the control unit 20 serving as reverse roller control means.

At S406, the control unit 20 determines whether or not the document reaches a position to change a direction of conveyance of the document (hereinafter referred to as a switchback position). When the document does not reach the switchback position (NO at S406), the control unit 20 drives the reverse motor 24 to convey the document until the document reaches the switchback position. By contrast, when the document reaches the switchback position (YES at S406), the process proceeds to S407. At S407, the control unit 20 controls the branch plate switching solenoid 25 to move the branch plate 12 to the position illustrated in FIG. 1A, and drives the reverse motor 24 to rotate the first reverse roller 16 in the reverse direction. As a result, the document is guided to the nip formed between the first discharge roller 11 and the relay roller 18, and is further conveyed to the reverse guide 19 by the first discharge roller 11.

When the document is conveyed to the reverse guide 19, the process returns to S401 so that the control unit 20 determines whether or not it is necessary to reverse the document again, and the rest of the processes are performed again as described above. The above-described processes are repeated to complete conveyance of the document.

Figure 7:
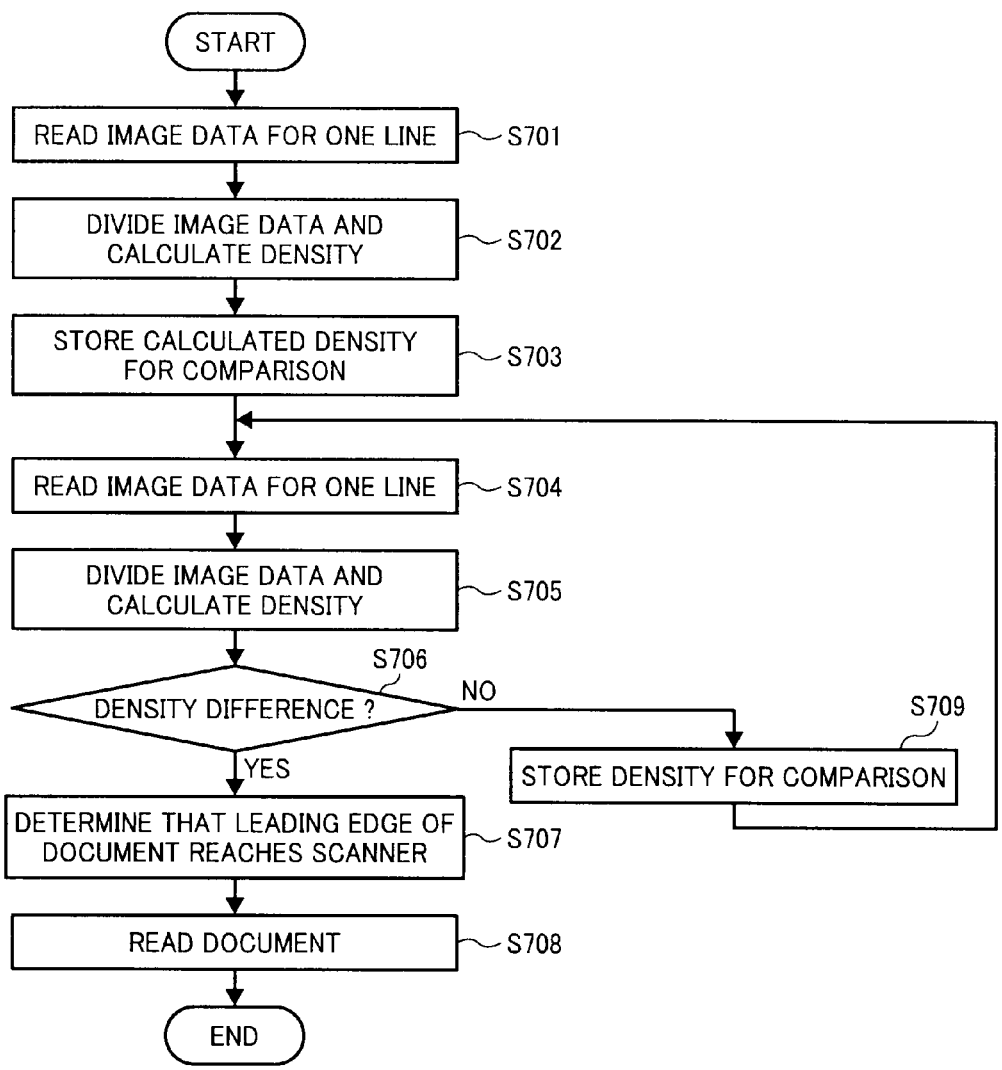
FIG. 7 is a flowchart illustrating operations to detect a document using an image sensor provided to the ADF according to the first illustrative embodiment.

A description is now given of detection of the leading edge of the document at the scanner 9 performed at S402 in FIG. 4, with reference to FIG. 7. FIG. 7 is a flowchart illustrating operations performed by the control unit 20 when the control unit 20 detects that the leading edge of document reaches the scanner 9. It is to be noted that, during the operations illustrated in FIG. 7, the main motor 23 is always driven and the document is conveyed through the conveyance path.

At S701, the image sensor 27 reads image data for one line at the scanner 9 under control of the control unit 20. At S702, the control unit 20 divides the image data for one line read by the image sensor 27 into multiple ranges and calculates an image density for each range.

When the document does not reach the scanner 9, the image sensor 27 scans a surface opposite the conveyance path. Because the surface opposite the conveyance path is white, the image density calculated at S702 when the document does not reach the scanner 9 is an image density for white. At S703, the control unit 20 stores the image density thus calculated at S702 for later comparison.

Thereafter, at S704, the control unit 20 controls the image sensor 27 again to read image data for one line. Because the document is conveyed by a distance of one line through the conveyance path while the processes from S701 to S703 are performed, a line following the line read at S701 is read at S704 when the document is conveyed through the scanner 9.

At S705, in the same manner as S702, the control unit 20 divides the image data read at S704 into multiple ranges and calculates an image density for each range. Thereafter, at S706, the control unit 20 compares the image density calculated at S705 to the image density stored for comparison at S703. Specifically, at S706, the image densities for each of the multiple ranges calculated at S705 is compared to the image densities for each of the multiple ranges stored at S703.

When a density difference is found in at least one range (YES at S706), the process proceeds to S707. At S707, the control unit 20 determines that the leading edge of the document has reached the scanner 9. Thereafter, at S708, the control unit 20 causes the scanner 9 to read image data of the document, and a series of processes is completed.

By contrast, when a density difference is not found (NO at S706), the process proceeds to S709. At S709, the control unit 20 stores the image density calculated at S705 for later comparison. Thereafter, the process returns to S704. It is to be noted that the process performed at S707 corresponds to the process performed at S402 in FIG. 4.

As described above, when there is a density difference in the image data read by the image sensor 27, the control unit 20 determines that the document has reached the scanner 9. Accordingly, the document can be detected at the scanner 9 using the image sensor 27. In other words, the image sensor 27 and the control unit 20 operate together to serve as a document detector.

It is to be noted that, preferably, a predetermined threshold is provided to determine presence of a density difference at S706. For example, if a very slight density difference causes the control unit 20 to determine presence of the density difference, the control unit 20 may inadvertently determine presence of the density difference even when the document does not reach the scanner 9 due to an error in a result obtained by scanning the surface opposite the conveyance path using the scanner 9. Therefore, in order to prevent such erroneous detection due to an error in a scan result, it is preferable to provide the threshold to accurately determine presence of the density difference.

As described above, in the ADF 100 according to the first illustrative embodiment, rotation of the first reverse roller 16 is stopped in order to temporarily bend the document to perform skew correction. The first reverse roller 16 is generally driven by the reverse motor 24 different from the main motor 23 to change the direction of conveyance of the document. Specifically, the ADF 100 according to the first illustrative embodiment can be easily implemented as software by the control unit 20 and the skew correction unit 26 without substantially altering the conventional mechanical configuration.

In a case of a conventional mechanism in which the document is struck against a nip formed between a first discharge roller and a relay roller to be bent for performing skew correction, additional components such as a crutch for stopping rotation of the first discharge roller are needed, resulting in an increase in costs and a decrease in productivity. By contrast, the ADF 100 according to the first illustrative embodiment having the above-described configuration can eliminate such cost increase and productivity decrease. Specifically, the first reverse roller 16 that can be rotated in both the normal and reverse directions and which can be easily stopped from rotating separately from rotation of the other rollers is provided, so that the above-described problems can be solved by striking the document against the first reverse roller 16.

According to the first illustrative embodiment, rotation of the first reverse roller 16 is stopped at S403. The purpose of stopping rotation of the first reverse roller 16 is to temporarily bend the document by conveying the document using the first discharge roller 11 while the document is struck against the nip formed between the first reverse roller 16 and the second reverse roller 17. In other words, alternatively, at S403, the control unit 20 may drive the reverse motor 24 to rotate the first reverse roller 16 in the reverse direction in order to prevent the document from passing through the nip formed between the first reverse roller 16 and the second reverse roller 17. As a result, the same effects as described above can be achieved.

According to the first illustrative embodiment, a period of time from when the document reaches the nip formed between the first reverse roller 16 and the second reverse roller 17 to when the document is bent is determined based on how long it has been since the document left the scanner 9, that is, a period of time after the document passes through the scanner 9. As illustrated in FIG. 7, the image sensor 27 detects that the document has reached the scanner 9. Alternatively, the same effects as those obtained by the first illustrative embodiment may be achieved by providing sensors along the second guide 8, the third guide 10, and so forth to detect the document. However, the document can be detected by the processes illustrated in FIG. 7 using the image sensor 27 without such sensors, thereby reducing the number of constituent components and costs.

Further, according to the first illustrative embodiment, the main motor 23 and the reverse motor 24 are provided as illustrated in FIG. 3, so that a motor different from the main motor 23 used for driving the rollers other than the first reverse roller 16, that is, the reverse motor 24, is used to drive the first reverse roller 16. Alternatively, all the rollers may be driven by the same motor, that is, the main motor 23, and a mechanism to rotate the first reverse roller 16 in the reverse direction may be additionally provided. As a result, the same effects as those obtained by the first illustrative embodiment can be provided. Provision of such a mechanism is described in detail below.

Figure 8:
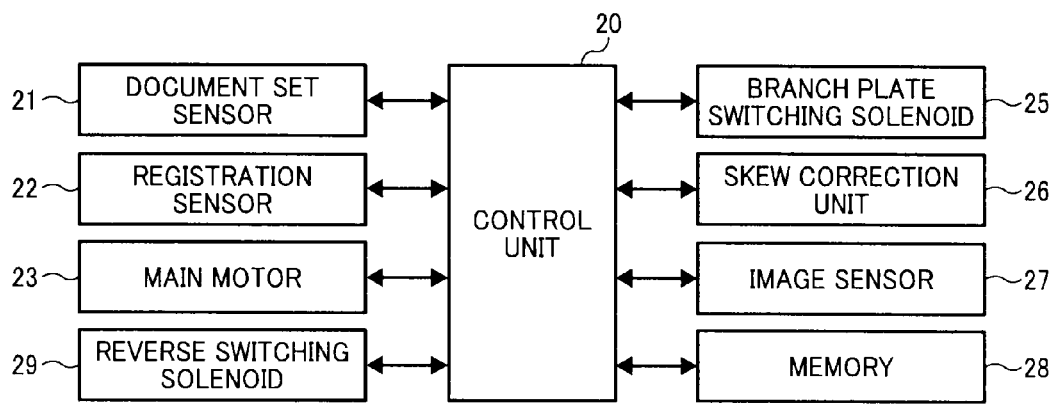
FIG. 8 is a block diagram illustrating a functional configuration of a control system of a document reading device including an ADF according to a second illustrative embodiment.

FIG. 8 is a block diagram illustrating a functional configuration of the control system of the document reading device including the ADF 100 according to a second illustrative embodiment. According to the second illustrative embodiment, the first reverse roller 16 is driven by the main motor 23, and a reverse switching solenoid 29 is provided in place of the reverse motor 24 illustrated in FIG. 3. The reverse switching solenoid 29 switches a direction of rotation of the first reverse roller 16 between the normal direction and the reverse direction under control of the control unit 20.

Figure 9A:
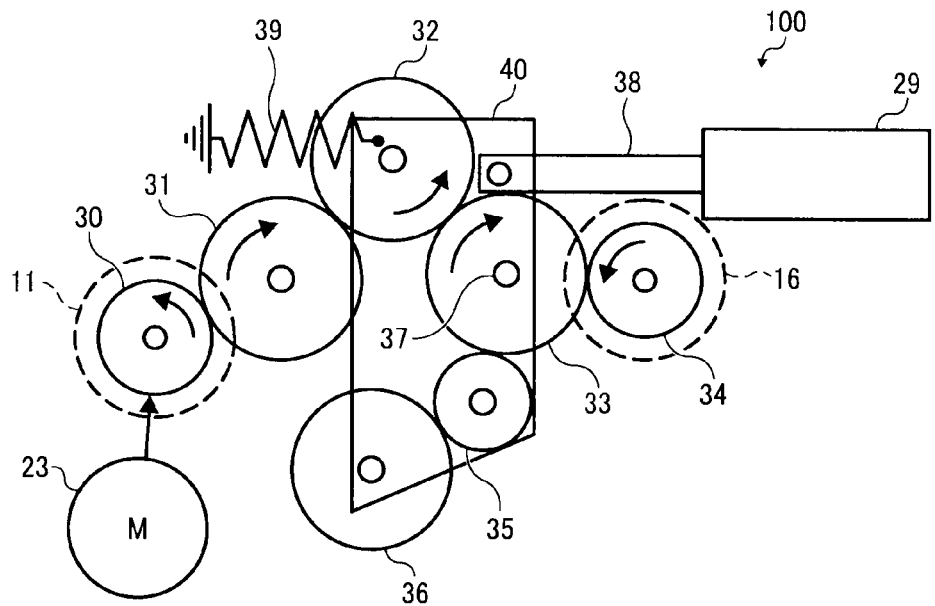
FIGS. 9A and 9B are cross-sectional views respectively illustrating a mechanism for switching a direction of rotation of a first reverse roller in the ADF according to the second illustrative embodiment.
Figure 9B:
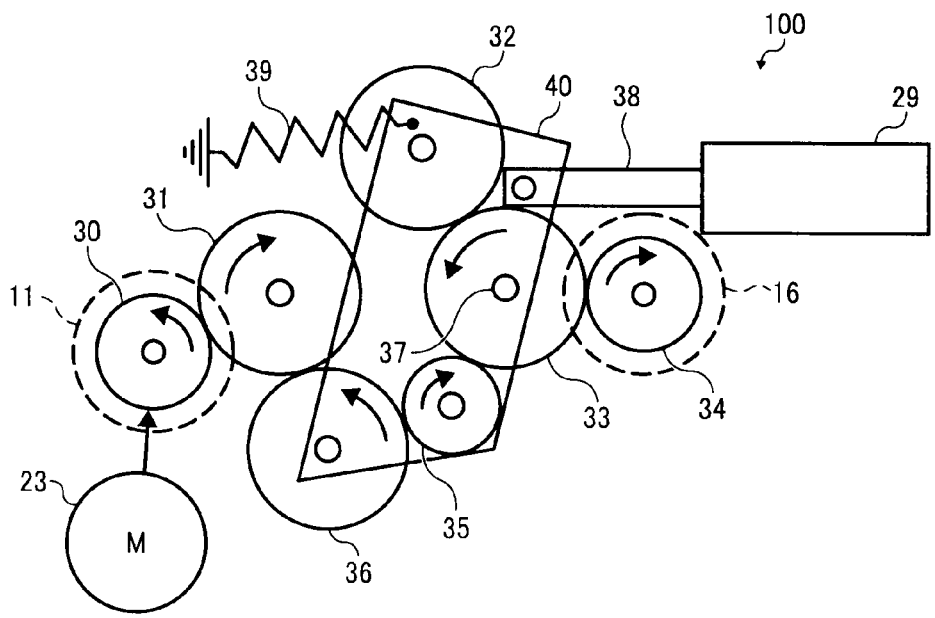

FIGS. 9A and 9B are cross-sectional views respectively illustrating a mechanical configuration of the ADF 100 according to the second illustrative embodiment for switching the direction of rotation of the first reverse roller 16 using the reverse switching solenoid 29. FIG. 9A illustrates a state in which the first reverse roller 16 is rotated in the reverse direction. Referring to FIG. 9A, a drive gear 30 is provided to a rotation axis of the first discharge roller 11. The main motor 23 rotates the drive gear 30 via a drive transmission mechanism, not shown, thereby rotating the first discharge roller 11. Meanwhile, a drive gear 34 is provided to a rotation axis of the first reverse roller 16.

Idler gears 31, 32, 33, 35, and 36 are provided between the drive gears 30 and 34, and the idler gears 32, 33, 35, and 36 are rotatably provided to a substrate 40.

A drive bar 38 of the reverse switching solenoid 29 is provided to the substrate 40, and the substrate 40 is rotated around a pivot 37 by turning on and off the reverse switching solenoid 29. FIG. 9A illustrates a state in which the reverse switching solenoid 29 is turned off. In such a state, the idler gears 31 and 32 are engaged with each other by a spring 39 fixed to the substrate 40. As a result, the drive gear 34 is rotated via the idler gears 31, 32, and 33, thereby rotating the first reverse roller 16 in the reverse direction.

Meanwhile, FIG. 9B illustrates a state in which the reverse switching solenoid 29 is turned on. In such a state, the drive bar 38 is pulled by the reverse switching solenoid 29 and the substrate 40 is rotated around the pivot 37, so that the idler gears 31 and 36 are engaged with each other. As a result, the drive gear 34 is rotated via the idler gears 31, 36, 35, and 33, thereby rotating the first reverse roller 16 in the normal direction. In other words, the reverse switching solenoid 29 serves as rotation direction switching means for switching the direction of rotation of the first reverse roller 16.

Operations performed by the ADF 100 according to the second illustrative embodiment are the same as those performed by the ADF 100 according to the first illustrative embodiment illustrated in FIGS. 4 and 7. However, according to the second illustrative embodiment, at S403, the control unit 20 controls the reverse switching solenoid 29 to cause the idler gear 31 not to engage with the idler gears 32 and 36. Accordingly, power of the main motor 23 is not transmitted to the first reverse roller 16, thereby stopping rotation of the first reverse roller 16.

As described above, according to the second illustrative embodiment, all the rollers including the first reverse roller 16 are driven by the main motor 23. As a result, it is not necessary to provide the reverse motor 24 separately from the main motor 23, resulting in cost decrease.

Elements and/or features of different illustrative embodiments may be combined with each other and/or substituted for each other within the scope of this disclosure and appended claims.

Illustrative embodiments being thus described, it will be apparent that the same may be varied in many ways. Such exemplary variations are not to be regarded as a departure from the scope of the present invention, and all such modifications as would be obvious to one skilled in the art are intended to be included within the scope of the following claims.

The number of constituent elements and their locations, shapes, and so forth are not limited to any of the structure for performing the methodology illustrated in the drawings.

What is claimed is:

1. A document feeder comprising:
   a conveyance path;
   a reverse path;
   a conveyance roller that conveys a document along the conveyance path;
   a reverse roller disposed downstream from the conveyance roller in a direction of conveyance of the document; and
   a control unit that controls both the conveyance roller and the reverse roller to correct skew of the document, the control unit controlling the conveyance roller to convey the document so as to cause the document to strike against a nip formed between the reverse roller and a roller provided opposite the reverse roller so as to temporarily bend the document,
   wherein the control unit controls the reverse roller to convey the document to the reverse path by reversing the direction of conveyance of the document when a trailing edge of the document has passed the conveyance roller.

2. The document feeder according to claim 1, wherein the control unit stops rotation of the reverse roller to strike such that the document strikes against the nip.

3. The document feeder according to claim 1, wherein the control unit rotates the reverse roller to convey the document in a direction opposite the direction of conveyance of the document conveyed by the conveyance roller to cause the document to strike against the nip.

4. The document feeder according to claim 1, further comprising a document detector that detects approach of the document to the reverse roller,
   wherein the control unit controls the reverse roller to cause the document to strike against the nip based on a detection result obtained by the document detector.

5. The document feeder according to claim 4, wherein the control unit drives the reverse roller to convey the document to the reverse path a predetermined period of time after controlling the reverse roller to cause the document to strike against the nip based on the detection result obtained by the document detector.

6. The document feeder according to claim 5, wherein the control unit determines elapse of the predetermined period of time, in part, by counting drive pulses of the conveyance roller after the document detector detects the document.

7. The document feeder according to claim 6, further comprising a pulse count data storage that stores data on a number of drive pulses of the conveyance roller counted during a period of time from when the document detector detects the document to when the document is caused to strike against the nip to be bent,
   wherein the control unit determines the elapse of the predetermined period of time based on data on a size of the document and the data on the number of drive pulses stored in the pulse count data storage.

8. The document feeder according to claim 7, wherein the pulse count data storage stores the data on the number of drive pulses of the conveyance roller for each size of the document conveyed through the conveyance path.

9. The document feeder according to claim 4, wherein the document detector comprises an image reading unit to generate image data by optically scanning the document conveyed through the conveyance path.

10. The document feeder according to claim 9, wherein the document detector generates two consecutive sets of image data in a main scanning direction using the image reading unit to detect the document based on a difference in image density between the two sets of image data.

11. The document feeder according to claim 1, further comprising:
    a drive motor that rotatively drives the conveyance roller and the reverse roller; and
    a rotation direction changing unit that changes a direction of rotation of the reverse roller.

12. The document feeder according to claim 11, wherein the rotation direction changing unit changes the direction of rotation of the reverse roller by switching a power transmission system provided between the drive motor and the reverse roller.

13. A method for controlling a document feeder to reverse a document by conveying the document to a reverse path, the method comprising the steps of:
    conveying the document along a conveyance path via a conveyance roller;
    conveying the document to the reverse path via a reverse roller, which is disposed downstream from the conveyance roller in a direction of conveyance of the document, by reversing the direction of conveyance of the document via the reverse roller when a trailing edge of the document has passed the conveyance roller; and
    controlling both the conveyance roller and the reverse roller to correct skew of the document by controlling the conveyance roller to convey the document so as to cause the document to strike against a nip formed between the reverse roller and a roller provided opposite the reverse roller so as to temporarily bend the document.

14. A non-transitory computer-readable medium including computer executable instructions, where the instructions, when executed by a data processing device, cause the data processing device to perform a method for controlling a document feeder to reverse a document by conveying the document to a reverse path, the method comprising the steps of:
    conveying the document along a conveyance path via a conveyance roller;
    conveying the document to the reverse path via a reverse roller, which is disposed downstream from the conveyance roller in a direction of conveyance of the document, by reversing the direction of conveyance of the document via the reverse roller when a trailing edge of the document has passed the conveyance roller; and
    controlling both the conveyance roller and the reverse roller to correct skew of the document by controlling the conveyance roller to convey the document so as to cause the document to strike against a nip formed between the reverse roller and a roller provided opposite the reverse roller so as to temporarily bend the document.

* * * * *